(12) United States Patent
Liu

(10) Patent No.: US 6,652,401 B2
(45) Date of Patent: Nov. 25, 2003

(54) METHOD OF TUNING A BELT DRIVE SYSTEM

(75) Inventor: Keming Liu, Sterling Height, MI (US)

(73) Assignee: The Gates Corporation, Denver, CO (US)

( * ) Notice: Subject to any disclaimer, the term of this patent is extended or adjusted under 35 U.S.C. 154(b) by 25 days.

(21) Appl. No.: 10/074,374

(22) Filed: Feb. 11, 2002

(65) Prior Publication Data

US 2003/0153421 A1 Aug. 14, 2003

(51) Int. Cl.[7] .................................................. F16H 7/12
(52) U.S. Cl. ........................................ 474/134; 474/135
(58) Field of Search ................................ 474/134, 135, 474/136, 137, 138

(56) References Cited

U.S. PATENT DOCUMENTS

| | | | |
|---|---|---|---|
| 3,630,096 A | 12/1971 | Brewer | 74/242.1 |
| 3,926,063 A | 12/1975 | Mayfield | 74/242.11 |
| 4,416,647 A | 11/1983 | White, Jr. | 474/134 |
| 4,478,595 A * | 10/1984 | Hayakawa et al. | 474/109 |
| 4,758,208 A | 7/1988 | Bartos et al. | 474/135 |
| 4,892,508 A | 1/1990 | Ryan et al. | 474/101 |
| 4,981,116 A | 1/1991 | Trinquard | 123/90.31 |
| 5,000,724 A | 3/1991 | Reid | 474/111 |
| 5,159,904 A * | 11/1992 | Ingold | 123/90.15 |
| 5,221,236 A | 6/1993 | Raymer et al. | 474/109 |
| 5,457,967 A | 10/1995 | Scherzinger | 66/151 |
| 5,938,551 A | 8/1999 | Warner | 474/111 |
| 6,167,686 B1 * | 1/2001 | Becker et al. | 56/17.3 |
| 6,179,740 B1 | 1/2001 | Walker | 474/134 |
| 2002/0039944 A1 * | 4/2002 | Ali et al. | 474/135 |
| 2002/0086751 A1 * | 7/2002 | Bogner et al. | 474/134 |

FOREIGN PATENT DOCUMENTS

DE 4243331 * 6/1994 .................. 474/138

* cited by examiner

Primary Examiner—Thomas R. Hannon
Assistant Examiner—Vicky A. Johnson
(74) Attorney, Agent, or Firm—J. A. Thurnau, Esq.; C. H. Castleman, Esq.; S. G. Austin, Esq.

(57) ABSTRACT

The invention comprises a method of using tensioners to tune a belt drive system. A tensioner having a damping rate is used on an accessory belt slack side and a tensioner having a having a damping rate is used on an accessory belt tight side. Outside of a predetermined engine speed range, the tight side tensioner arm does not move because the dynamic tension in the span is less than the tight side tensioner friction damping. Within a predetermined engine speed range the tight side tensioner arm moves in order to damp a belt drive system vibration.

12 Claims, 7 Drawing Sheets

METHOD OF TUNING A BELT DRIVE SYSTEM

FIELD OF THE INVENTION

The invention relates to a method of tuning a belt drive system, more particularly, to a method of tuning a belt drive system vibration by using a tensioner having a damping rate on an accessory belt tight side and a tensioner having a damping rate on an accessory belt slack side to tune a system vibration.

BACKGROUND OF THE INVENTION

Mechanical tensioners are widely used in automobile engines to control belt tensions of accessory belt drives. Friction damping, force or torque, is usually utilized in a tensioner to control tensioner arm motion and vibration of the belt drive system. A belt drive with a high vibration level will require high damping from the tensioner to prevent belt slip, noise, span vibration, as well as other noise, vibration and harshness problems. However, the friction damping of a tensioner has a certain limitation dictated by system requirements, tensioner tension, belt life and tensioner size. Because of the tensioner's limit of friction damping, there are some IC engines where a mechanical tensioner alone is not capable of properly controlling belt tensions and consequently they are unable to eliminate vibration and noise problems from a belt drive.

Other tensioners are available that comprise two pulleys that simultaneously engage a belt, but they do not tune a system vibration.

Representative of the art is U.S. Pat. No. 4,416,647 (1997) to White which discloses a belt tensioner having a pulley simultaneously engaging a belt tight side and a belt slack side on either side of a driven accessory. The pulleys are connected to an arm. The arm is pivotally connected to a surface at a single pivot point.

Also representative of the art is U.S. Pat. No. 4,981,116 (1991) to Trinquard which discloses an apparatus for wrapping a belt more than 180 degrees around a wheel of an engine. The device teaches reducing the amplitude of the variations of tension in a belt under extreme conditions. Only one of the pulleys is pivotably mounted to a lever.

What is needed is a belt drive system having two tensioners for tuning a system vibration. What is needed is a belt drive system tuned by using a tensioner having a damping rate on an accessory belt tight side and a tensioner having a damping rate on an accessory belt slack side. What is needed is a belt drive system tuned by using a tensioner having a damping rate on an accessory belt tight side and a tensioner having a damping rate on an accessory belt slack side wherein the accessory has a highest effective inertia as compared to other system components. What is needed is a belt drive system tuned by using a tensioner having a damping rate on an accessory belt tight side and a tensioner having a damping rate on an accessory belt slack side wherein each tensioner is joined by a biasing member. The present invention meets these needs.

SUMMARY OF THE INVENTION

The primary aspect of the invention is to provide a belt drive system having two tensioners for tuning a system vibration.

Another aspect of the invention is to provide a belt drive system tuned by using a tensioner on an accessory belt tight side and a tensioner on an accessory belt slack side.

Another aspect of the invention is to provide a belt drive system tuned by using a tensioner on an accessory belt tight side and a tensioner on an accessory belt slack side wherein the accessory has a highest effective inertia as compared to other system components.

Another aspect of the invention is to provide a belt drive system tuned by using a tensioner on an accessory belt tight side and a tensioner on an accessory belt slack side wherein each tensioner is joined by a biasing member.

Other aspects of the invention will be pointed out or made obvious by the following description of the invention and the accompanying drawings.

The invention comprises a method of using tensioners to tune a belt drive system. A tensioner having a damping rate is used on an accessory belt slack side and a tensioner having a having a damping rate is used on an accessory belt tight side. Outside of a predetermined engine speed range, the tight side tensioner arm does not move because the dynamic tension in the span is less than the tight side tensioner friction damping. Within a predetermined engine speed range the tight side tensioner arm moves in order to damp a belt drive system vibration.

DETAILED DESCRIPTION OF THE INVENTION

Figure 1:
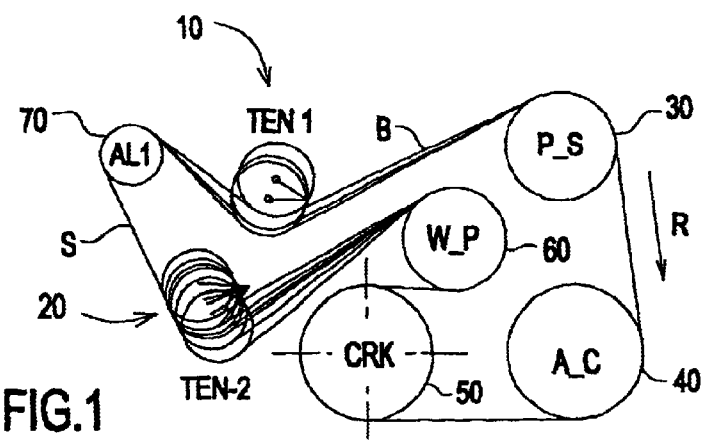
FIG. 1 is a schematic view of an inventive tensioner system.

Mechanical tensioners are widely used in automobile engines to control a belt tension on a front end accessory belt drive. In such a system a mechanical tensioner will have a limit of friction damping. This mean no movement of a tensioner arm will occur if a dynamic tension amplitude is less than a friction damping magnitude. That is, if the dynamic tension amplitude is insufficient the tensioner arm and pulley will not move and instead will act as a fixed idler.

As a result, on certain internal combustion (IC) engines a single mechanical tensioner is not capable of properly controlling a belt tension and consequently is unable to significantly eliminate vibration and noise from a belt drive, particularly during low RPM operation such as in an idle range.

The instant invention solves the vibration and noise problem by adding an additional tensioner having a damping rate to the belt drive system to cooperatively operate with a first mechanical tensioner, also having a damping rate, to improve system dynamics. The second tensioner may also replace other devices such as an alternator decoupler, C/S isolator, and so on.

A tensioner frictional damping force for the first and second tensioner may be generated by any of various methods known in the tensioner art, for example, by use of a damping shoe mechanism engaged with a damping surface having a coefficient of friction. Other embodiments of the tensioner are shown in FIGS. 12, 13, 14 and 15.

The present invention is capable of tensioning a belt drive system having complex vibration or transient dynamics. The inventive system may comprise:

1) Two separate tensioners: One tensioner having a damping mechanism installed on a slack side belt span before a high inertia accessory such as an alternator, and the other tensioner having a damping mechanism is installed on a tight side belt span, each with respect to a belt rotational direction. Each tensioner having a spring rate and a damping rate; or
2) A two-pulley tensioner: Two pulleys moveably mounted to a rail, see FIGS. 14 and 15, or pivotably mounted around a common pivot, see FIGS. 12 and 13. Each pulley is connected by a biasing member and each has a damping rate. The biasing member may comprise a torsion spring. One pulley is disposed at a belt slack side span before an accessory alternator and the other pulley is disposed on a belt tight side span after an accessory alternator as viewed from a belt rotation direction.

Benefits of the present invention include:

1) Tuning effect: The instant invention significantly tunes a system vibrational frequency so that no significant drive resonance will be present in a predetermined engine RPM range.
2) Greater damping: Two tensioners, each having a damping rate, dissipate more vibration energy from the belt drive than a single tensioner.
3) Greater Tension Control: Greater tension control is realized under very fast engine acceleration and decelerations, for example in a range of 3,000 to 9,000 RPM/second, as compared to a prior art single tensioner system.

Figure 6:
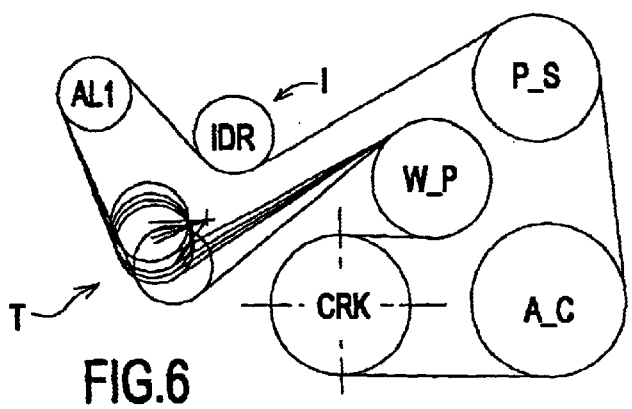
FIG. 6 is a schematic of a prior art tensioner system.

The inventive two-tensioner belt drive is shown in FIG. 1. By way of comparison, FIG. 6 depicts a prior art single tensioner drive with a tensioner located at T on a belt slack side of an accessory such as an alternator, ALT. In the inventive system tensioner 10 is disposed on a belt B tight side with respect to an accessory, such as an alternator 70. Tensioner 20 is disposed on a belt slack side S with respect to an accessory 70. The belt moves in a direction R driven by a crankshaft pulley 50. Tensioner 10 and tensioner 20 each comprise a damping mechanism for damping a pulley movement and a torsional spring for creating a belt tension.

In order to achieve the beneficial tuning effect, it is preferred that the accessory having the greatest effective moment of inertia be disposed between the two tensioners.

In the exemplary inventive system the accessory with the greatest effective moment of inertia is alternator 70.

The following approximate effective moment of inertia values are given by way of example and not of limitation for the inventive system.

| Pulley | Effective Inertia [kg/m$^2$] |
|--------|------------------------------|
| CRK    | (Driver Pulley)              |
| A_C    | 0.0035                       |
| P_S    | 0.0012                       |
| ALT    | 0.0137                       |

One can see that the effective moment of inertia of the alternator 70, ALT, is over ten times greater than that for the power steering pump 30, P_S, and approximately four times greater than for the air conditioning compressor 40, A_C. One can appreciate that the effective moment of inertia values may vary depending upon the design of an engine system and as such are given here for exemplary purposes only.

Belt B is driven by a crankshaft pulley 50 in direction R. As noted, the system may comprise other accessories driven by pulley 50, including an air conditioner (A_C) compressor 40, a water pump (W_P) 60 and a power steering pump (P_S) 30.

Figure 2:
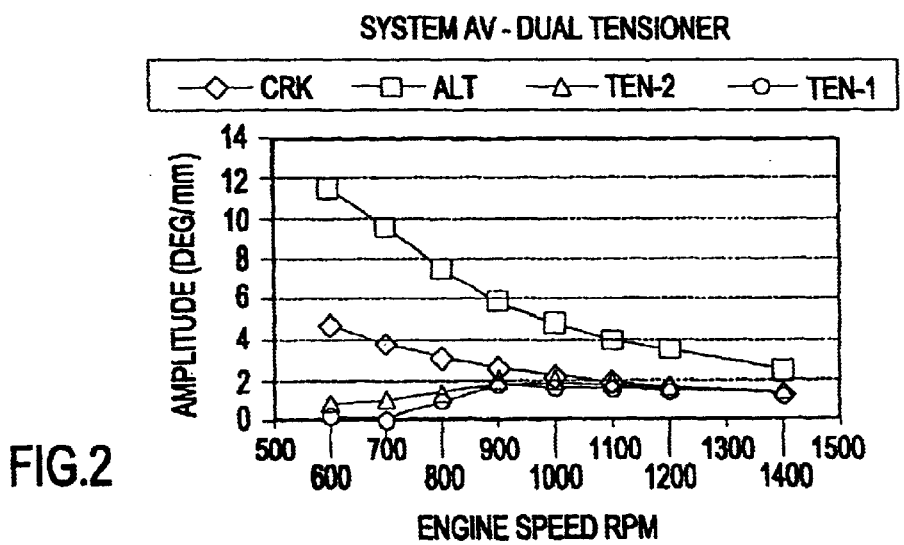
FIG. 2 is a graph demonstrating dual tensioner system vibration performance.
Figure 7:
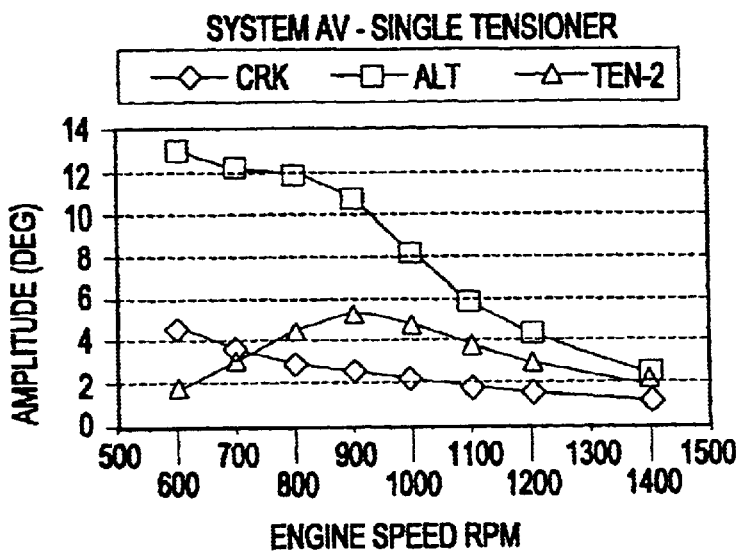
FIG. 7 is a graph demonstrating prior art tensioner system vibration performance.

FIG. 2 is a graph demonstrating dual tensioner system vibration performance. By way of comparison, FIG. 7 is a graph demonstrating the vibration performance of a prior art single tensioner system.

"Tuning" a system as used herein refers to changing a natural frequency of a vibrating system, in this case the belt, so that at excitation frequency the system will not resonate or will resonate less than a system that is not tuned. For example, for a 4-cylinder engine each cylinder fires once for every two rotations of the crankshaft. At 900 RPM a 4-cylinder engine will have a firing frequency of 30 Hz. A single tensioner system has its first resonant frequency at approximately 30 Hz and will resonate at approximately 900 RPM. In the inventive two-tensioner system, a $1^{st}$ drive resonant frequency can be tuned to approximately 15 Hz, for example. 15 Hz is the firing frequency of a 4-cylinder engine at 450 rpm, which is considerably below an idle speed of 700 to 800 RPM. Consequently, in the inventive two tensioner system, a system vibration is tuned and thereby reduced since there will be no system resonance in the engine operation speed range.

A damping rate for TEN 1 is in the range of approximately 20–40%. For a tensioner with friction damping, the friction force or torque generated by the damping mechanism is in proportion to either hub load force (from belt tension) or a spring load (force or torque):

$$\text{Friction damping} = Mu * K * \text{load}$$

where

Mu—coefficient of friction of damping mechanism

K—factor of damping mechanism, designed to adjust a damping effect

Friction damping is generated from the load of the spring which also controls belt tension. As a spring load increases, so does the friction damping. Damping rate is used to define the magnitude and rate of friction damping. It is generally a constant. Some tensioners use a separate spring to generate damping friction by loading a damping shoe that it engaged with a frictional surface, known in the art. In this case a damping rate is not a constant because the friction effect is constant but the tension spring force (torque) is not. So it is always possible to define tensioner friction damping with a rate. Only the rate is a constant for some design and a variable for others.

At speeds below 700 RPM, tensioner TEN 1, item 10 in FIG. 1, will not move because a dynamic belt tension of TEN 1 belt span is less than a TEN 1 friction damping. Therefore TEN 1 acts like a fixed idler leaving the second tensioner 20 to damp a belt system vibration. Consequently, the belt drive system vibrates similar to that with a single tensioner. Second tensioner 20 spring rate is further adjusted such that within the predetermined engine speed range a belt dynamic tension is greater than the second tensioner friction damping such that second tensioner 20 is moveable.

At speeds above 700 RPM, a dynamic tension of the TEN 1 belt span exceeds TEN 1 friction damping. The damping rate for tensioner TEN 2 is in the range of approximately 20–70%. In this mode, TEN 1 moves or oscillates and the drive system dynamics are greatly improved due to the damping/tuning effect of the second tensioner. In other words, a second tensioner 20 spring rate is adjusted whereby outside a predetermined engine speed range a belt dynamic tension is less than the second tensioner friction damping such that second tensioner 20 is substantially motionless.

By comparing FIG. 2 and FIG. 7, one can see that no resonance is present in the inventive system in FIG. 2, as shown by the modified amplitude curve for the alternator "ALT" and tensioner "TEN 2". Such movement of second tensioner 20 substantially reduces a vibration resonance of the belt drive system. In FIG. 2, the predetermined engine speed range wherein tensioner 20 is moveable is approximately 600 to 1400 RPM.

Figure 3:
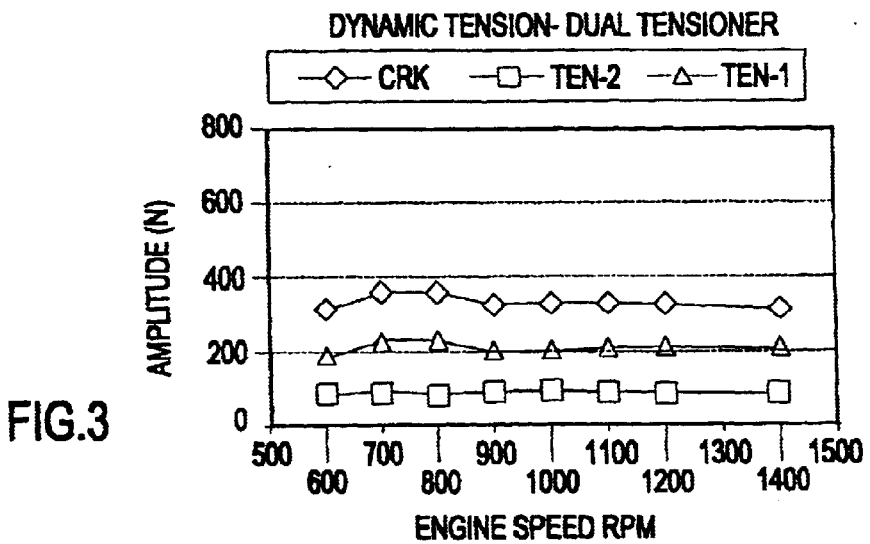
FIG. 3 is a graph demonstrating two tensioner system dynamic tension performance.
Figure 8:
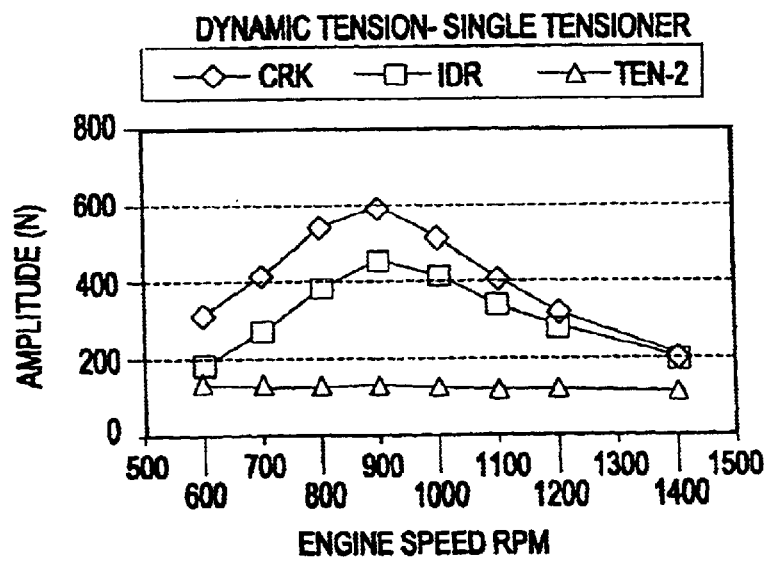
FIG. 8 is a graph demonstrating prior art tensioner system dynamic tension performance.

FIG. 3 is a graph demonstrating two tensioner system dynamic tension performance. For comparison, FIG. 8 is a graph demonstrating prior art tensioner system dynamic tension performance. Dynamic tension in a belt drive is determined by the system vibration, both amplitude and phase. Dynamic tension is the result of a belt span elongation which in turn is the result of vibration of the pulleys at each end of the span. However, amplitude alone does not create high dynamic tension. For example, a crank drives an alternator at speed ratio of 3. If the crank vibrates at 3 deg and the alternator vibrates at 9 deg (in phase), there will be no dynamic tension. If the pulleys vibrate in opposite phase, the dynamic tension of that span is maximized.

In the inventive system tensioner TEN1 is disposed in the position occupied by idler IDR in the prior art single tensioner system, see FIG. 6. One can see that for the inventive system shown in FIG. 3, a dynamic tension amplitude at the crankshaft "CRK" (item 50 in FIG. 1) is significantly reduced as compared to the crankshaft "CRK" (CRK in FIG. 6) in the prior art system in FIG. 8. Further, a dynamic tension amplitude at the idler "IDR" (IDR in FIG. 6) in the prior art system is significantly reduced at tensioner "TEN2" (item 20 in FIG. 1). Significant dynamic tension amplitude reductions realized by the inventive system result in an increase in the operational life of inventive system components, including a system belt, as well as reducing a noise and vibration emitted from the belt drive system.

Figure 4:
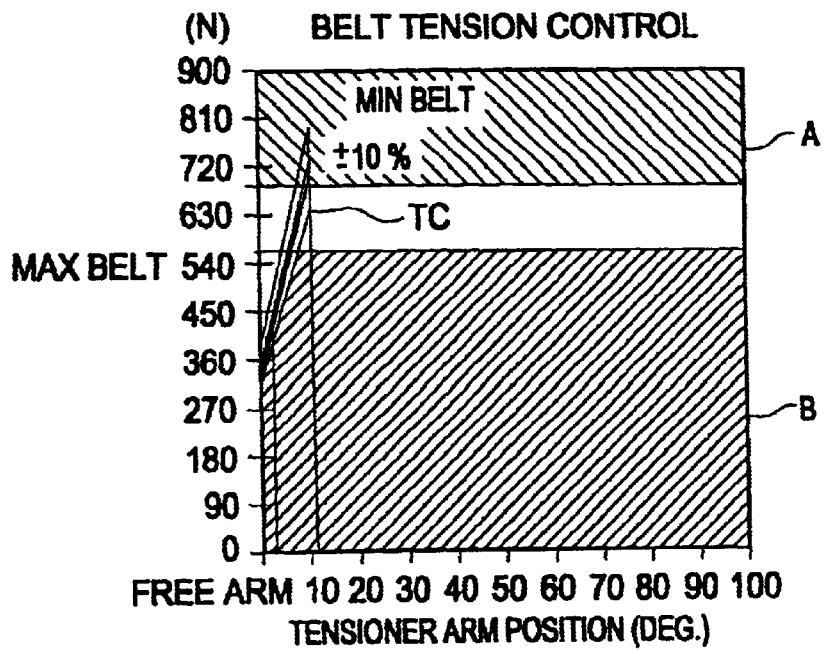
FIG. 4 is a graph demonstrating belt tension control by the inventive system.

FIG. 4 is a graph illustrating belt tension control by the inventive system. The FIG. 4 graph is for the belt tight side tensioner 10. The Y-axis denotes a belt load in newtons. The X-axis denotes a tensioner arm position in degrees. The upper shaded region A denotes a belt performance threshold and relates to a maximum belt load operating condition. The lower shaded region B denotes a minimum belt performance threshold, at which it is likely that a belt slip would occur.

One can see tight-side tensioner 10 has a steeply sloped tension control curve TC. This means it comprises a large tension change with a minimum arm travel, for example, a 200N to 400N tension change over 5 deg. of arm travel.

Figure 5:
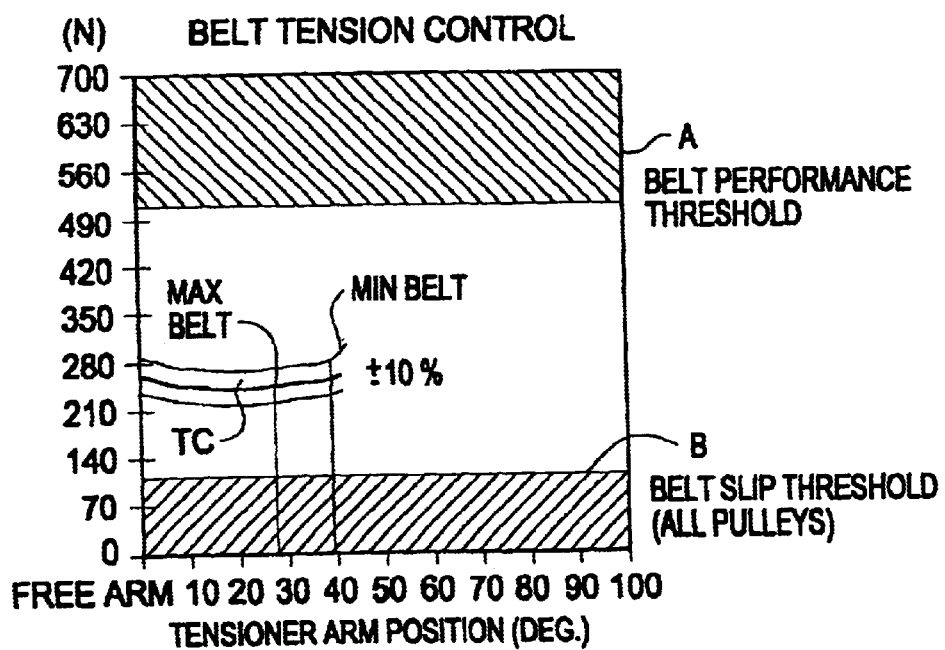
FIG. 5 is a graph demonstrating belt tension control by the inventive system.

FIG. 5 is a graph illustrating belt tension control by the inventive system. FIG. 5 is for the belt slack side tensioner 20. The Y-axis denotes a belt load in newtons. The X-axis denotes a tensioner arm position in degrees. The upper shaded region A denotes a belt performance threshold and relates to a maximum belt load operating condition. The lower shaded region B denotes a minimum belt performance threshold, below which it is likely that a belt slip would occur.

Once can see compared to FIG. 4 slack-side tensioner 20 has a relatively flat tension control curve TC. This means tensioner 20 exhibits a small tension variation, approximately less than 10% of a mean value, over a relatively large tensioner arm travel range, for example in a range of 260N to 270N over 40° of arm travel. This is achieved by matching a tensioner spring characteristic line to a desired spring curve as is known in the art.

In operation, belt slack-side tensioner 20 controls an overall belt tension for the entire belt drive system. Belt tight-side tensioner 10 adjusts a belt tension to meet a torque requirement for a high effective inertia accessory such as an alternator. The torque requirement is generally controlled by the need to control or prevent a belt slip. Although other components may be disposed between the two tensioners, in the preferred system only the accessory having the highest effective inertia be disposed between the two tensioners.

In order to achieve the benefits noted above, both tensioners comprise damping adequate to the particular service needs. Further, the damping values must be low enough so that each tensioner arm will move when subjected to the critical condition. The critical condition usually occurs when most or all of the accessory components are loaded. More particularly, when a damping force of a tensioner is lower than an amplitude [N] of a dynamic tension variation of a tensioner belt span, the tensioner arm will move. When the damping force of a tensioner is greater than an amplitude [N] of a dynamic tension variation of a tensioner belt span, the tensioner arm will not move. One can readily appreciate that during operation one or both or the tensioners may be moving, or, one or both of the tensioners may be stationary.

Figure 9:
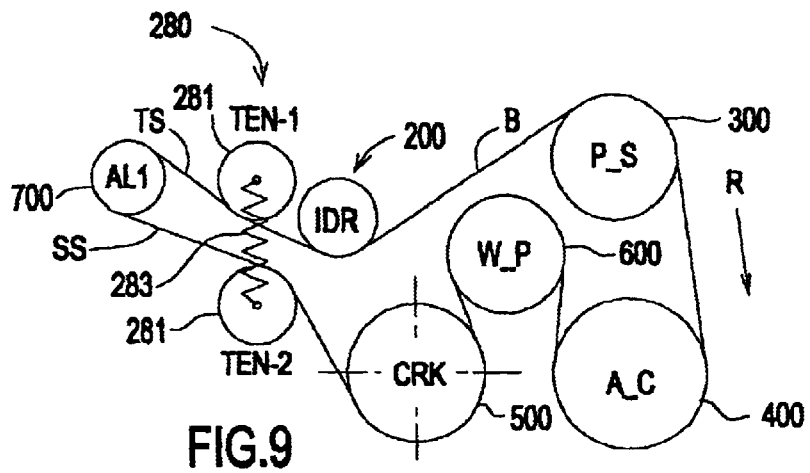
FIG. 9 is a schematic view of an inventive tensioner system.

FIG. 9 is a schematic view of an inventive two-pulley tensioner system. In a belt drive system, tensioner 280 is disposed having a pulley 281 on a belt B tight side and a pulley 281 on a belt slack side with respect to an accessory, such as an alternator 700. See FIGS. 14 and 15. Biasing member or spring 283 is connected between pulleys 281 thereby exerting a force on the belt. Member 283 exerts a spring force upon the belt through the pulleys so as to create a tension in belt B.

Belt B is driven by a crankshaft pulley 500. The system may comprise other accessories driven by pulley 500, including an air conditioner compressor 400, a water pump 600 and a power steering pump 300. A belt direction of travel is R.

Tension control using a two pulley tensioner system shown in FIG. 9 is achieved mainly by geometrical variation and damping from the pulley motion. For example, when the belt drive is not running, a belt tension for a tight-side span TS and slack-side span SS at each pulley is approximately the same, as determined by a spring 283 force. Spring 283 force operates on each tensioner pulley, thereby creating a belt load, see FIGS. 14 and 15.

When the belt drive is in operation and the alternator 700 is loaded, for example 9N-m torque on a 60 mm alternator pulley 700, the mean tension on the tight-side belt span TS will be approximately 300N higher than the on the slack-side belt span SS.

One can appreciate that dynamic equilibrium has to be satisfied for every component in the belt drive, including the tensioner pulleys and alternator. In order to tune the system, both tensioner pulleys are moveable when subjected to the critical operating condition. As noted previously, the critical operating condition usually occurs when most or all of the accessory components are loaded. More particularly, when a damping force of a tensioner is lower than an amplitude of a dynamic tension variation of a tensioner belt span, the tensioner pulley will move. When the damping force of a tensioner is greater than an amplitude of a dynamic tension vibration of a tensioner belt span, the tensioner pulley will not move. One can readily appreciate that during operation one or both or the tensioners may be moving, or, one or both of the tensioners may be stationary.

The damping force from each pulley is determined based on the system requirement. The damping force is not so high as to create a one pulley seized situation, but is sufficient to dissipate more vibration energy.

Figure 10:
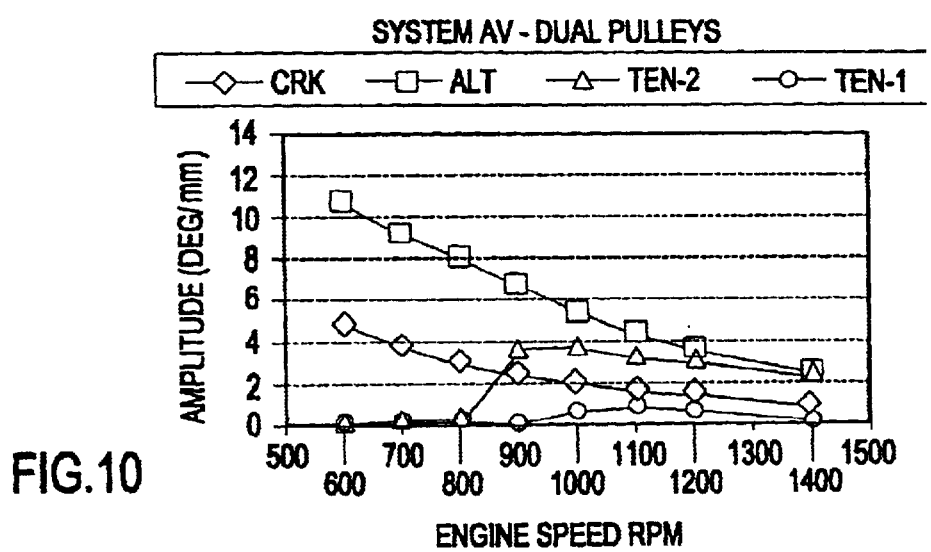
FIG. 10 is a graph demonstrating two pulley tensioner system vibration performance.

FIG. 10 is a graph demonstrating two-pulley tensioner system performance. By way of comparison to FIG. 7, one can readily see that an alternator amplitude is significantly reduced across the operating range, particularly between 600 and 1000 RPM.

Figure 11:
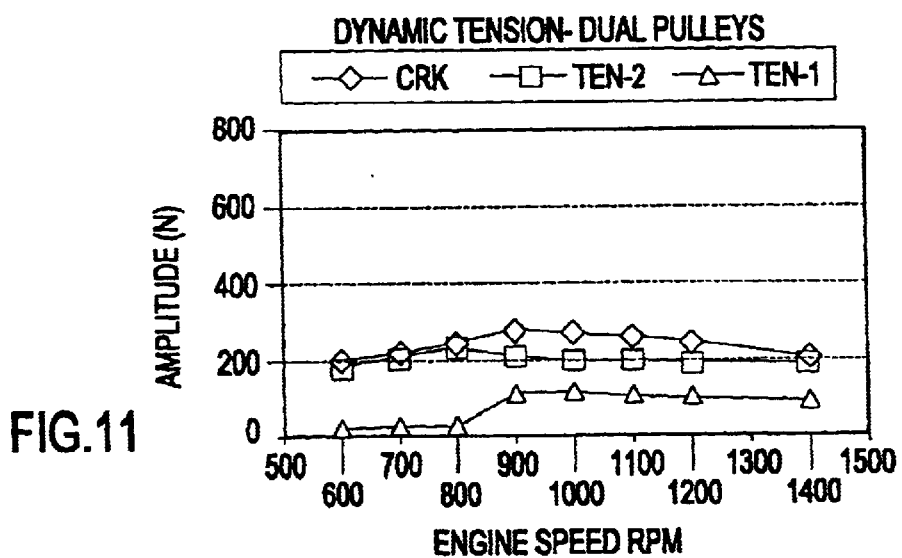
FIG. 11 is a graph demonstrating two pulley tensioner system dynamic tension performance.

FIG. 11 is a graph demonstrating two-pulley tensioner system performance. By way of comparison to FIG. 8, one can see that the amplitude at crankshaft "CRK" is significantly reduced compared to crankshaft "CRK" on FIG. 8. As well, the amplitude at the idler "IDR" is also significantly reduced at the TEN 1 position.

Figure 12:
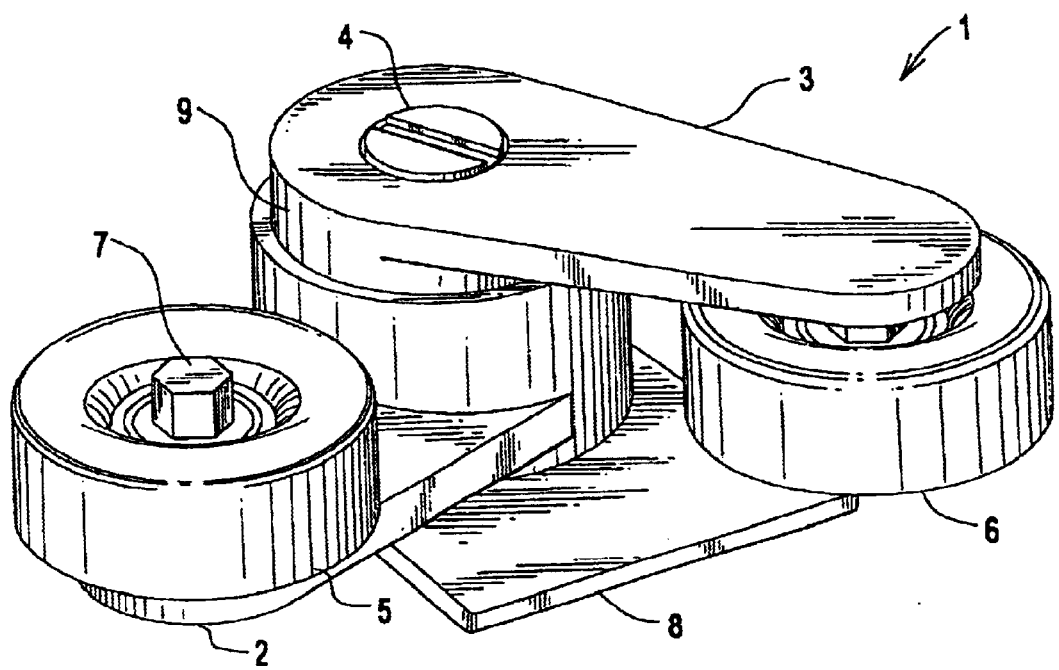
FIG. 12 is a perspective view of a two pulley tensioner.

FIG. 12 is a perspective view of a two pulley tensioner. Tensioner 1 comprises arm 2 and arm 3 each connected at pivot 4. Pulley 5 is rotatably connected to arm 2 by shaft 7. Pulley 6 is rotatably connected to arm 3 in a like manner by a shaft (not shown). A torsional spring contained within body 9 urges arm 2 and arm 3 toward each other. For example, and not by way of limitation, the damping mechanism such as disclosed in U.S. Pat. No. 5,632,697, incorporated herein by reference, may be incorporated in the tensioner.

Figure 13:
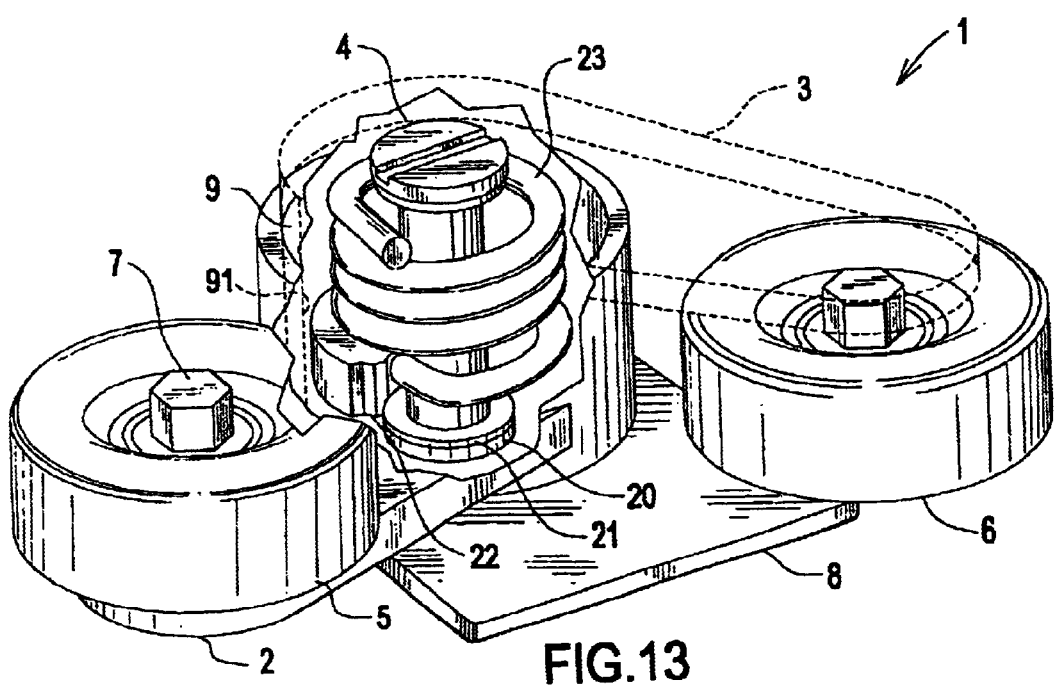
FIG. 13 is a cut-away perspective view of a two-pulley tensioner.

FIG. 13 is a cut-away perspective view of a two-pulley tensioner. Pivot 4 comprises a bearing 20 with anti-friction washer 21. Torsion spring 23 has one end connected to arm 3 and the other end connected to damping shoe 22. Damping shoe 22 bears upon an inner friction surface 91 of body 9. A movement of arm 2 or 3 is damped by a frictional force caused by shoe 22 bearing on surface 91. The spring also contributes a spring force to the damping force thereby causing a damping rate as described elsewhere in this specification. The two-tensioner pulley described in FIGS. 12 and 13 is an example of a tensioner that may be used in the described application. It is not offered as a limitation on the type of tensioner that may be used in the disclosed application.

Figure 14:
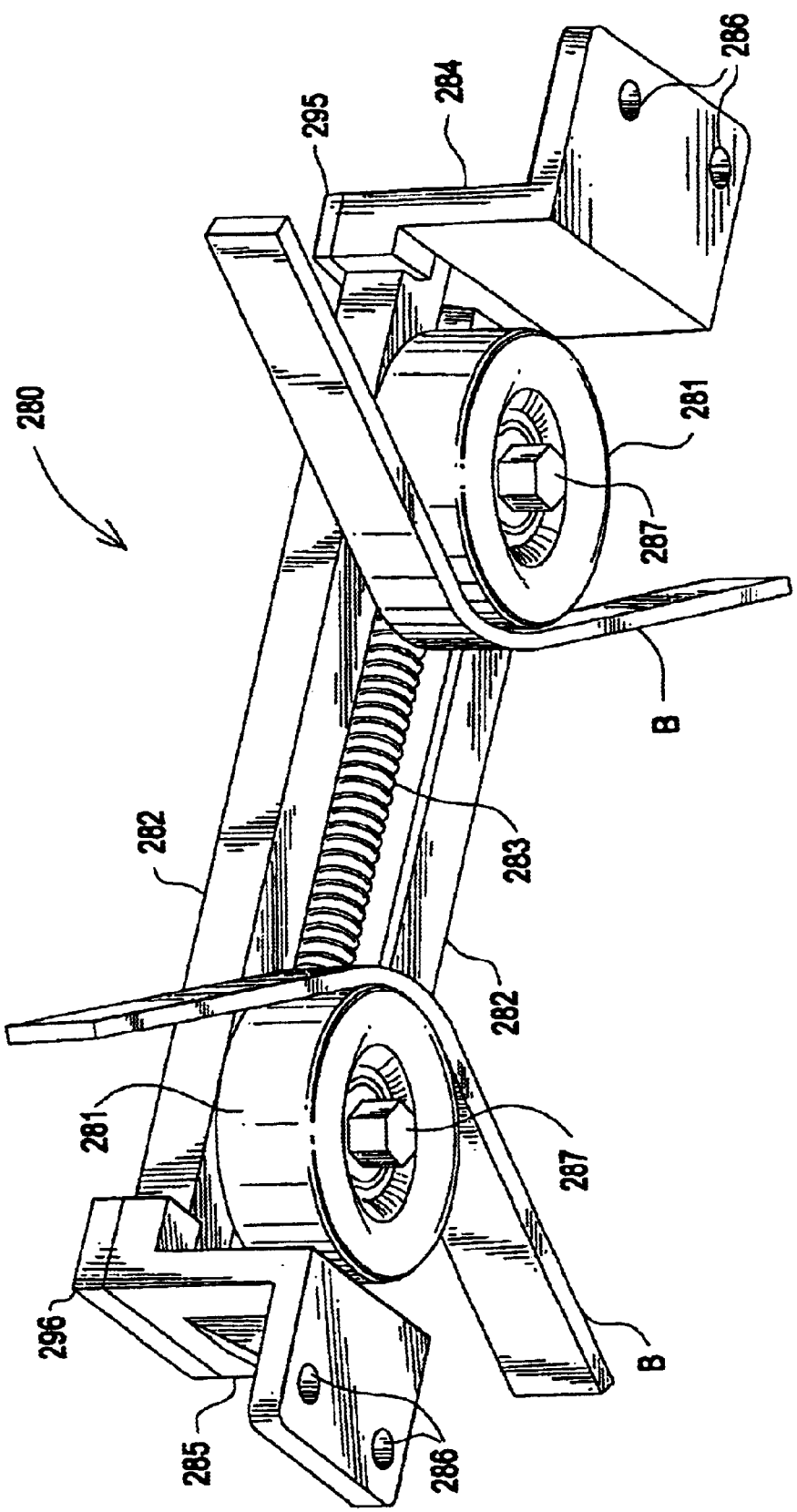
FIG. 14 is a perspective view of a rail two pulley tensioner.

FIG. 14 is a perspective view of a rail two pulley tensioner. Tensioner 280 comprises rail 282 between mounting members 284 and 285. Rail 282 generally comprises a "C" shaped cross-section, see FIG. 15. Spring 283 extends between pulleys 281. Spring 283 has a spring rate k5. Spring 283 urges pulleys 281 toward each other, thereby tensioning a belt B. Pulleys 281 spin on shafts 287. Shafts 287 are mounted to moveable members 288, see FIG. 15. Holes 286 allow tensioner 280 to mounted to a mounting surface on an engine for example. Caps 295 and 296 connect rail 282 to mounting members 284, 285 respectively.

Figure 15:
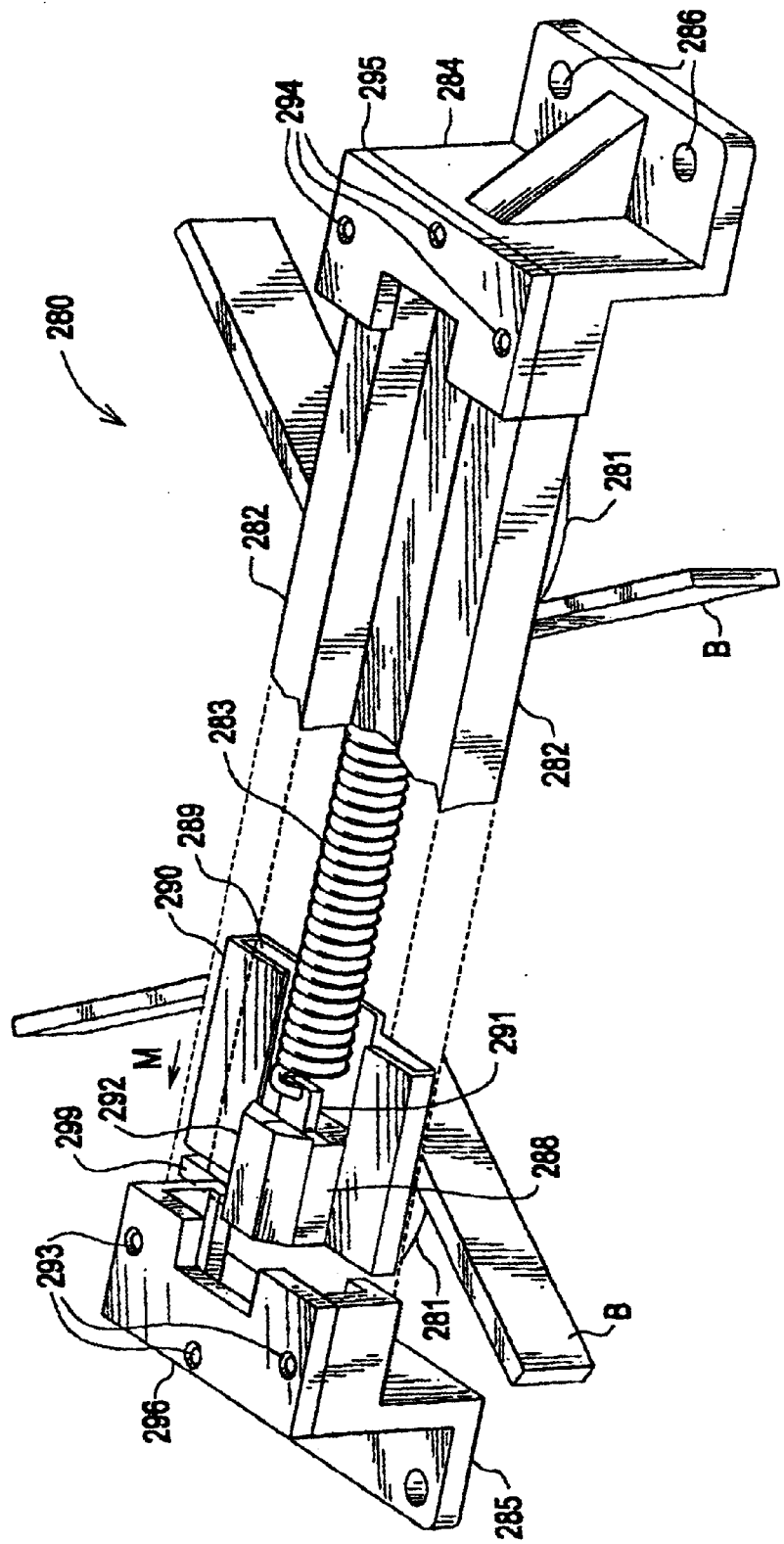
FIG. 15 is a perspective view of a rail two pulley tensioner.

FIG. 15 is a perspective view of a rail two pulley tensioner. Holes 293, 294 receive fasteners (not shown) for connected caps 296, 295 respectively, to mounting members 285, 284 respectively.

Rail 282 describes a slot 289 having a liner 290 with which moveable member 288 is slideably engaged. Liner 290 has a predetermined coefficient of friction. Member 291 attaches spring 283 to moveable member 288. Moveable member 288 has a shape to cooperatively engage slot 289. Moveable member 288 comprises a predetermined coefficient of friction.

A movement of moveable member 288 in slot 289 is subject to a damping force which damps a movement of moveable member 288, thereby damping a movement of belt B. Spring 283 contributes a force to the damping force. The spring force and frictional damping force combine to cause a damping rate as described elsewhere in this specification. Member 292 comprises a damping member having a shape to cooperatively engage a like shaped groove in rail 282. Member 292 has a predetermined coefficient of friction.

The overall damping coefficient of the tensioner comprises the contribution from liner 290, member 288, member 292 and spring 283.

Stop 299 is mounted at an end of slot 289. Stop 289 is disposed at a predetermined location to stop a movement a slack-side pulley 281 in a direction M. During normal operation, pulley moveable member 288 is not touching stop 299. However, during high deceleration a belt slack-side can temporarily become the belt tight-side. Stop 299 limits a movement of the pulley when the belt span is under a higher tension than may be seen in normal condition. Unlimited pulley movement during a deceleration mode may result in significant loss of belt tension, thereby causing a belt slip. Stop 299 allows a limited movement of member 288 without exceeding a position whereby a slip may occur. In this case the normally tight-side pulley then operates to control a belt tension and prevent a slip noise or vibration. Stop 299 may comprise any material, including resilient materials such as natural and synthetic rubbers, as well as those having a high modulus such as metal, and their equivalents.

Although forms of the invention have been described herein, it will be obvious to those skilled in the art that variations may be made in the construction and relation of parts without departing from the spirit and scope of the invention described herein.

I claim:

1. A belt drive system comprising:

a belt entrained between a driver pulley and driven pulley;

a first tensioner for engaging a belt slack side relative the driven pulley, the first tensioner having a damping rate in the range of approximately 20% to 40%; and a second tensioner for engaging a belt tight side relative the driven pulley, the second tensioner having a damping rate in the range of approximately 20% to 70%.

2. A method of adjusting a vibration in a belt drive system comprising the steps of:

engaging a first tensioner with a belt slack side relative a driven accessory;

engaging a second tensioner with a belt tight side relative the driven accessory;

adjusting the second tensioner whereby outside a predetermined engine speed range a belt dynamic tension is less than a second tensioner friction damping such that the second tensioner is substantially motionless; and adjusting the second tensioner whereby within the predetermined engine speed range a belt dynamic tension is greater than the second tensioner friction damping such that the second tensioner is moveable to substantially reduce a vibration of the belt drive system.

3. The method as in claim 2 comprising the step of:

setting a belt drive first resonant frequency less than a predetermined engine speed.

4. The method as in claim 2 further comprising the step of using a plurality of driven accessories, each driven accessory having a pulley.

5. The method as in claim 4 further comprising the step of selecting the driven accessory having a maximum inertia relative to other driven accessories.

6. The method as in claim 5, further comprising the step of having a predetermined engine speed range of approximately 600 to 1400 RPM.

7. The method as in claim 2 further comprising the steps of:

providing the first tensioner with a substantially flat tension control curve; and providing the second tensioner with a substantially steeply sloped tensioner control curve.

8. The method as in claim 7 further comprising the step of:

providing a damping rate for the first tensioner in the range of approximately 20% to 40%; and providing a damping rate for the second tensioner in the range of approximately 20% to 70%.

9. A belt drive system comprising:

a belt entrained between a driver pulley and driven pulley;

a first tensioner having a pulley and a first damping mechanism, the first tensioner pulley engaged with a belt slack side and having a damping rate such that the first tensioner pulley is substantially motionless for a damping force less than an amplitude of a belt dynamic tension; and a second tensioner having a pulley and a second damping mechanism, the second tensioner pulley engaged with a belt tight side and having a damping rate such that the second tensioner pulley is substantially motionless for a damping force less than an amplitude of a belt dynamic tension.

10. The belt drive system as in claim 9 wherein the first damping mechanism and second damping mechanism comprises a damping member engaged with a friction surface.

11. The belt drive system as in claim 9 wherein the driven pulley is connected to a high effective inertia accessory.

12. The belt drive system as in claim 9, wherein:

the damping rate for the first tensioner in the range of approximately 20% to 40%; and the damping rate for the second tensioner in the range of approximately 20% to 70%.

* * * * *